(12) United States Patent
Bai et al.

(10) Patent No.: US 10,262,241 B2
(45) Date of Patent: Apr. 16, 2019

(54) METHOD AND APPARATUS FOR RECOGNIZING CHARACTER STRING IN IMAGE

(71) Applicant: Tencent Technology (Shenzhen) Company Limited, Shenzhen (CN)

(72) Inventors: Xiang Bai, Shenzhen (CN); Juhong Wang, Shenzhen (CN); Tingting Liu, Shenzhen (CN); Wei Chen, Shenzhen (CN); Baoguang Shi, Shenzhen (CN); Cong Yao, Shenzhen (CN); Pengyuan Lv, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 40 days.

(21) Appl. No.: 15/721,881

(22) Filed: Sep. 30, 2017

(65) Prior Publication Data
US 2018/0025256 A1 Jan. 25, 2018

Related U.S. Application Data

(63) Continuation-in-part of application No. PCT/CN2016/102569, filed on Oct. 19, 2016.

(30) Foreign Application Priority Data

Oct. 20, 2015 (CN) .......................... 2015 1 0682699

(51) Int. Cl.
*G06K 9/72* (2006.01)
*G06K 9/62* (2006.01)
(Continued)

(52) U.S. Cl.
CPC .......... *G06K 9/6277* (2013.01); *G06K 9/325* (2013.01); *G06K 9/62* (2013.01); *G06K 9/6217* (2013.01);
(Continued)

(58) Field of Classification Search
CPC .... G06K 9/6277; G06K 9/325; G06K 9/6256; G06K 9/6217; G06K 9/62;
(Continued)

(56) References Cited

U.S. PATENT DOCUMENTS 6,327,387 B1* 12/2001 Naoi .................... G06K 9/2054
382/173
6,654,728 B1* 11/2003 Li ......................... G06T 7/0012
706/2
(Continued)

FOREIGN PATENT DOCUMENTS

CN 103077389 A 5/2013
CN 104134079 A 11/2014
(Continued)

OTHER PUBLICATIONS

Tencent Technology, ISRWO, PCT/CN2016/102569, dated Jan. 24, 2017, 8 pgs.
(Continued)

*Primary Examiner* — Samir A Ahmed
(74) *Attorney, Agent, or Firm* — Morgan, Lewis & Bockius LLP

(57) ABSTRACT

Embodiments of this disclosure belong to the field of computer technologies and disclose a method and an apparatus for recognizing a character string in an image. The method includes: according to image data of a pre-stored sample image block including a character string, and based on a convolutional neural network algorithm, constructing an expression of a probability set corresponding to a character string recognition result of the sample image block, the
(Continued)

expression of the probability set being constituted by a to-be-determined parameter; based on a training target of maximizing a probability that the character string recognition result determined according to the probability set is the character string included in the pre-stored sample image block, training the plurality of to-be-determined parameters to obtain a training value for each to-be-determined parameter; and when a to-be-recognized target image block is obtained, determining, based on the convolutional neural network algorithm and the training values of the plurality of to-be-determined parameters, a target probability set corresponding to the target image block, and determining, according to the target probability set, a character string recognition result of the target image block. By means of the embodiments of this disclosure, correctness of recognizing a character string can be improved.

20 Claims, 6 Drawing Sheets

(51) Int. Cl.
  *G06N 3/04* (2006.01)
  *G06K 9/32* (2006.01)
(52) U.S. Cl.
  CPC .............. *G06N 3/04* (2013.01); *G06N 3/0454* (2013.01); *G06K 2209/01* (2013.01)
(58) Field of Classification Search
  CPC ...... G06K 2209/01; G06T 2207/20081; G06N 3/0454; G06N 3/04; G06N 3/08; B25J 9/161; B25J 9/163; G05B 13/027
  See application file for complete search history.

(56) References Cited

U.S. PATENT DOCUMENTS

| | | | | |
|---|---|---|---|---|
| 2004/0255218 | A1* | 12/2004 | Tada | G06F 17/30011 714/747 |
| 2006/0215937 | A1* | 9/2006 | Snapp | G06K 9/723 382/311 |
| 2008/0131001 | A1 | 6/2008 | Hofman et al. | |
| 2009/0190841 | A1* | 7/2009 | Hamamura | G06K 9/00852 382/229 |
| 2009/0208112 | A1* | 8/2009 | Hamamura | G06K 9/00469 382/195 |
| 2015/0347860 | A1* | 12/2015 | Meier | G06K 9/72 382/140 |
| 2015/0347861 | A1* | 12/2015 | Doepke | H04N 5/23245 382/199 |
| 2016/0125275 | A1* | 5/2016 | Hamada | G06F 17/2785 382/229 |
| 2017/0017857 | A1* | 1/2017 | Wolf | G06K 9/00335 |

FOREIGN PATENT DOCUMENTS

| | | |
|---|---|---|
| CN | 104809481 A | 7/2015 |
| CN | 104966097 A | 10/2015 |

OTHER PUBLICATIONS

Tencent Technology, IPRP, PCT/CN2016/102569, dated Apr. 24, 2018, 7 pgs.

* cited by examiner

METHOD AND APPARATUS FOR RECOGNIZING CHARACTER STRING IN IMAGE

RELATED APPLICATIONS

This application is a continuation-in-part application of PCT/CN2016/102569, entitled "METHOD AND DEVICE FOR RECOGNIZING CHARACTER STRING IN IMAGE" filed on Oct. 19, 2016, which claims priority to Chinese Patent Application No. 201510682699.9, filed with the State Intellectual Property Office of the People's Republic of China on Oct. 20, 2015, and entitled "METHOD AND APPARATUS FOR RECOGNIZING CHARACTER STRING IN IMAGE", both of which are incorporated herein by reference in their entirety.

FIELD OF THE TECHNOLOGY

Embodiments of this disclosure relate to the field of computer technologies, and in particular, to a method and an apparatus for recognizing a character string in an image.

BACKGROUND OF THE DISCLOSURE

During working and living, people are exposed to a lot of images of natural scene images including text (text may be regarded as a character string). The text includes abundant information. For example, all of a product number included in a photograph of a product label, a license plate number included in a photograph of a vehicle license plate, a road number included in a photograph of a road sign, a product name and an advertising message included in a photograph of an advertising sign, and the like include text, and automatically obtaining text information in the natural scene images can help people more effectively understand and apply the images. Therefore, recognizing the text information has a very important practical value. For example, recognizing a vehicle license plate may be applied to traffic management, and so on.

Currently, when a character string in a natural scene image is extracted, a character string included in a natural scene image is first detected, character strings whose gaps satisfy a preset threshold may be separately divided to obtain image blocks including the character strings, and then, the character strings in the image blocks obtained by division may be separately recognized. A method for recognizing a character string in an image block is usually that: technical personnel may pre-store a lot of reference image blocks, the reference image blocks include different character strings, matching degrees between a target image block and the reference image blocks are calculated, and a character string included in a reference image block having the highest matching degree is used as a character string recognition result of the target image block. Therefore, to ensure a favorable recognition result, a lot of reference image blocks need to be stored, resulting in low calculation efficiency. For the foregoing problem, currently, another method is dividing a character string in a target image block according to characters, and a single character after the division is recognized, so that a quantity of stored reference image blocks is reduced.

SUMMARY

Embodiments of this disclosure provide a method and an apparatus for recognizing a character string in an image. The technical solutions are described as follows:

According to a first aspect, a method for recognizing a character string in an image is performed at a computing device having one or more processors and memory storing one or more programs to be executed by the one or more processors, the method comprising:

constructing an expression of a probability set corresponding to a character string recognition result of a pre-stored sample image block of a character string based on a convolutional neural network algorithm, the expression of the probability set being constituted by a plurality of to-be-determined parameters of the convolutional neural network algorithm, and probabilities in the probability set used for indicating a probability that a character at one of a preset quantity of character positions is one of a plurality of preset characters;

training the plurality of to-be-determined parameters to obtain a training value for each to-be-determined parameter based on a training target of maximizing a probability that the character string recognition result determined according to the probability set is the character string comprised in the pre-stored sample image block;

obtaining a to-be-recognized target image block;

calculating, based on the convolutional neural network algorithm and the training values of the plurality of to-be-determined parameters, a target probability set corresponding to the target image block; and determining, according to the target probability set, a character string recognition result of the target image block.

According to a second aspect, a computing device comprises one or more processors, memory and one or more programs stored in the memory that, when executed by the one or more processors, cause the computing device to perform the aforementioned method for recognizing a character string in an image.

According to a third aspect, a non-transitory computer readable storage medium stores one or more programs that, when executed by one or more processors of a computing device, cause the computing device to perform the aforementioned method for recognizing a character string in an image.

In the embodiments of this disclosure, according to image data of a sample image block that is stored in a training sample library and that includes a character string, and based on a convolutional neural network algorithm, an expression of a probability set corresponding to a character string recognition result of the sample image block is constructed, the expression of the probability set being constituted by a plurality of to-be-determined parameters of the convolutional neural network algorithm, and probabilities included in the probability set being individually used for indicating a probability that a character at any character position of a preset quantity of character positions is any character of a plurality of preset characters; according to the expression of the probability set, based on a training target of maximizing a probability that the character string recognition result determined according to the probability set is the character string included in the pre-stored sample image block, the to-be-determined parameter is trained to obtain a training value for each to-be-determined parameter; and when a to-be-recognized target image block is obtained, a target probability set corresponding to the target image block is determined based on the convolutional neural network algorithm and the training values of the plurality of to-be-determined parameters, and a character string recognition result of the target image block is determined according to the target probability set. In this way, a character string in a target image block can be directly recognized without first dividing the character string character by character and then, recognizing a single character after the division. That is, a recognition result is no longer dependent on a division result, so that correctness of character string recognition can be improved.

BRIEF DESCRIPTION OF THE DRAWINGS

To describe the technical solutions in the embodiments of this disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

In the prior art, a character string in a target image is divided according to characters, and a method for recognizing a single character after the division is excessively dependent on a division result. However, a natural scene in a natural scene image is usually complex, and usually, all characters cannot be correctly obtained by means of division. That is, correctness of obtaining each character by means of division in a natural scene image is relatively low. Consequently, correctness of recognizing a character string in an image is relatively low. For the problems existing in the prior art, embodiments of this disclosure provide a method for recognizing a character string in an image. To make objectives, technical solutions, and advantages of this disclosure more clear, implementations of this disclosure are further described below in detail with reference to accompanying drawings.

Figure 1:
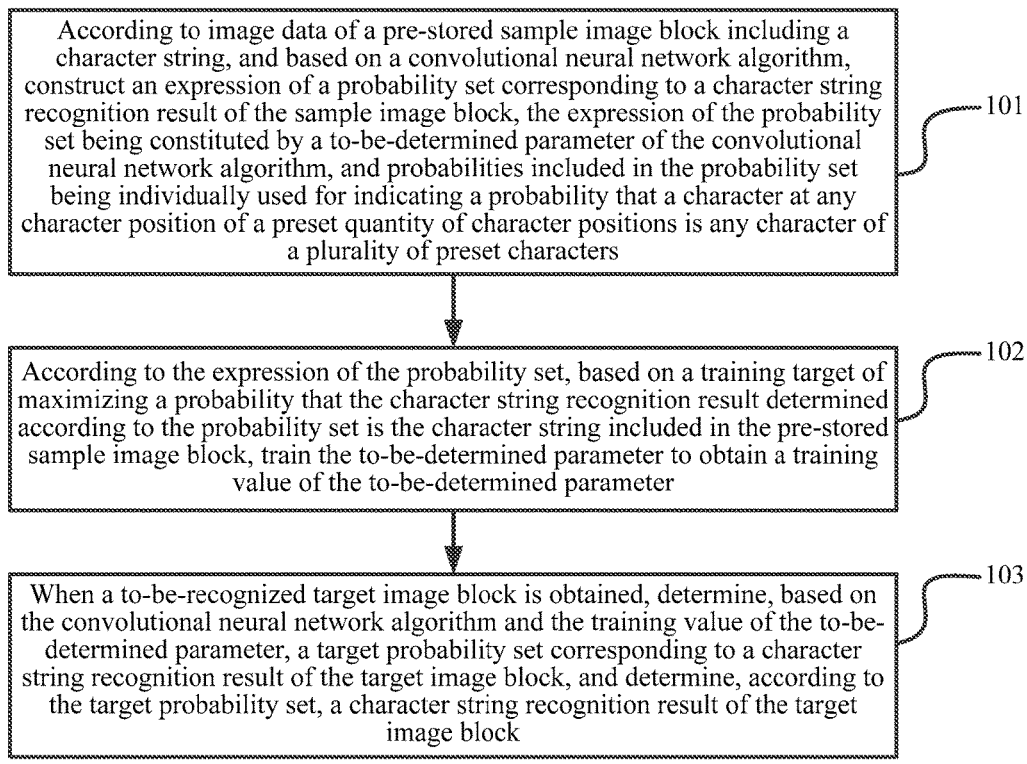
FIG. 1 is a flowchart of a method for recognizing a character string in an image according to an embodiment of this disclosure.

As shown in FIG. 1, a processing procedure of this method may include the following operations:

Operation 101: According to image data of a pre-stored sample image block including a character string, and based on a convolutional neural network algorithm, construct an expression of a probability set corresponding to a character string recognition result of the sample image block, the expression of the probability set being constituted by a plurality of to-be-determined parameters of the convolutional neural network algorithm, and probabilities included in the probability set being individually used for indicating a probability that a character at any character position of a preset quantity of character positions is any character of a plurality of preset characters.

Operation 102: According to the expression of the probability set, based on a training target of maximizing a probability that the character string recognition result determined according to the probability set is the character string included in the pre-stored sample image block, train the plurality of to-be-determined parameters to obtain a training value for each to-be-determined parameter.

Operation 103: When a to-be-recognized target image block is obtained, determine, based on the convolutional neural network algorithm and the training values of the plurality of to-be-determined parameters, a target probability set corresponding to the target image block, and determine, according to the target probability set, a character string recognition result of the target image block.

In the embodiments of this disclosure, according to image data of a sample image block that is stored in a training sample library and that includes a character string, and based on a convolutional neural network algorithm, an expression of a probability set corresponding to a character string recognition result of the sample image block is constructed, the expression of the probability set being constituted by a plurality of to-be-determined parameters of the convolutional neural network algorithm, and probabilities included in the probability set being individually used for indicating a probability that a character at any character position of a preset quantity of character positions is any character of a plurality of preset characters; according to the expression of the probability set, based on a training target of maximizing a probability that the character string recognition result determined according to the probability set is the character string included in the pre-stored sample image block, the to-be-determined parameter is trained to obtain a training value for each to-be-determined parameter; and when a to-be-recognized target image block is obtained, a target probability set corresponding to the target image block is determined based on the convolutional neural network algorithm and the training values of the plurality of to-be-determined parameters, and a character string recognition result of the target image block is determined according to the target probability set. In this way, a character string in a target image block can be directly recognized without first dividing the character string character by character and then, recognizing a single character after the division. That is, a recognition result is no longer dependent on a division result, so that correctness of character string recognition can be improved.

Embodiments of this disclosure provide a method for recognizing a character string in an image, and an execution body of this method is a server or a terminal. A server may be a server for recognizing a character string in an image. A processor and a memory may be disposed in the server, the processor may be configured to train a to-be-determined parameter in a convolutional neural network algorithm and recognize a character string in a target image block, and the memory may be configured to store needed data and generated data in the following processing process. The terminal may be a terminal on which an application program for recognizing a character string in an image. A processor and a memory may be disposed in the terminal, the processor may be configured to train a to-be-determined parameter in a convolutional neural network algorithm and recognize a character string in a target image block, and the memory may be configured to store needed data and generated data in the following processing process. This embodiment is described in detail by using an example in which an execution body is a server.

The processing procedure shown in FIG. 1 is described below in detail with reference to the specific implementations, and the content may be as follows:

Operation 101: According to image data of a pre-stored sample image block including a character string, and based on a convolutional neural network algorithm, construct an expression of a probability set corresponding to a character string recognition result of the sample image block, the expression of the probability set being constituted by a plurality of to-be-determined parameters of the convolutional neural network algorithm, and probabilities included in the probability set being individually used for indicating a probability that a character at any character position of a preset quantity of character positions is any character of a plurality of preset characters.

The character string may be a character string constituted by an English character, an Arabic numeral, and the like. The to-be-determined parameter may be a constant in a convolutional neural network and may be determined by means of a training process. The character position may be a position of each character in a character string. For example, a character string "cloud" corresponds to five character positions, a character at the first character position is "c", and the preset character may be a character, such as English characters, a to z, that is likely to appear in the character string.

During implementation, the server may obtain, in advance, some sample image blocks whose image content includes a character string (for example, an English word) and store them in a training sample library. The sample image blocks whose image content includes a character string may be obtained by combining image content of natural scene image blocks with a preset character string. The character string included in each sample image block is known, and all of the sample image blocks have a same size. For example, the size may be 32*100. If the sample image block is a color image block, the color image block may be converted into a grayscale image block, and if the sample image block is a grayscale image block, it can be directly processed. The server may perform processing on image data of a sample image block according to a convolutional neural network algorithm including a to-be-determined parameter, and may obtain an expression of a probability set including a preset quantity. The expression of the probability set includes the plurality of to-be-determined parameters of the convolutional neural network algorithm. The server may determine, according to the obtained expression of the probability set, a character string included in the sample image block. The probability set may be represented by using a matrix (which may be referred to as a probability matrix). That is, a quantity of columns is a quantity of character positions and may be represented by N (that is, N represents a maximum length of a character string that may be recognized). A quantity of rows is a quantity of preset characters and may be represented by M. The expression of the probability set is an element value at each position in the probability matrix. The element value at each position represents a probability that a corresponding preset character is at a corresponding character position. An element value at a position may be represented by $a_{ij}$ (that is, indicating an element value at a position on the $i^{th}$ row and the $j^{th}$ column in the matrix, where i=1, 2, ... M, and j=1, 2, ... M). Each dimension in each column may correspond to a preset character 0. For example, M is 37, each dimension may separately correspond to an a to z character, a 0 to 9 character, or a blank space character, and $a_{1,2}$ indicates a probability that the second position of the character string is a character "a", that is, indicating that the server can recognize a characters string constituted by an a to z character, a 0 to 9 character, or a blank space character. This embodiment is described in detail by using an example in which M is 37, the preset character is an a to z character, a 0 to 9 character, or a blank space character, and N is 25, and other cases are similar and are not described in detail again.

In some embodiments, to obtain an expression of a probability set corresponding to a sample image block, convolutional processing, pooling processing, linear processing, and softening processing may be performed on image data of the sample image block in sequence, and correspondingly, a processing process may be as follows: performing convolutional processing for a first preset quantity of times, pooling processing for a second preset quantity of times, and linear processing for a third preset quantity of times on the image data of the sample image block to obtain an expression of a corresponding first feature vector; and performing softening processing on the expression of the first feature vector and constructing the expression of the probability set corresponding to the character string recognition result of the sample image block.

During implementation, the convolutional neural network algorithm may also be referred to as a convolutional neural network model, the server may preset, according to requirements, a quantity of convolutional layers included in the convolutional neural network model, a quantity of pooling layers included in the convolutional neural network model, and a quantity of linear hidden layers included in the convolutional neural network model. The quantity of convolutional layers, the quantity of pooling layer, and the quantity of linear hidden layers respectively correspond to the first preset quantity of times, the second preset quantity of times, and the third preset quantity of times. The convolutional layer includes a to-be-determined parameter of the convolutional neural network model, that is, a convolution kernel and an initial offset parameter. When the convolutional neural network algorithm is used for calculation, a parameter in the convolutional neural network model may be initialized in advance. Initialization of a parameter may be completed randomly, and the initialized parameter may satisfy Gaussian distribution whose average is 0 and whose standard deviation is 0.01. The server may process each pre-stored sample image block based on the convolutional neural network algorithm to obtain an expression, that is, a probability matrix, of a probability set corresponding to each sample image block. That is, the server may perform convolutional processing for a first preset quantity of times, pooling processing for a second preset quantity of times, and linear processing for a third preset quantity of times on each pre-stored sample image block to obtain an expression of a corresponding first feature vector, and then, perform softmax softening processing on the expression of the first feature vector, so as to obtain a probability matrix corresponding to each sample image block. The softmax softening processing may be used to reduce a difference between element values (that is, softening a value in the first feature vector) and may normalize the values into a range of 0 to 1, where a sum thereof is 1.

In this embodiment, a specific process of obtaining a probability set corresponding to each sample image block may be described in detail by using an example in which a first preset quantity of times is 5, a second preset quantity of times is 4, a third preset quantity of times is 3, and a size of a sample image block is 32*100, and the specific process may be as follows:

For any sample image block, a periphery of a sample image block is filled with pixels with a specified grayscale value according to a preset range (for preventing a size of the sample image block from being reduced after convolutional processing is performed on the sample image block), so that a filled image block of the sample image block may be obtained. The preset range may be additional 2 laps of pixel points on the periphery the sample image block, a value of a pixel point may be 0, and the size of the filled image block of the sample image block is 36*104. The obtained filled image block may be used as input of a first convolutional layer (equivalent to a filled area of the first convolutional layer is 2*2). That is, convolutional processing is performed on the filled image block and a convolution kernel and an initial offset parameter of the first convolutional layer. Different convolution kernels correspond to different initial offset parameters, and the different convolution kernels and initial offset parameters are to-be-determined parameters included in the convolutional neural network model. Specifically, the first convolutional layer may include 96 convolution kernels, a size of each convolution kernel is 5*5 (that is, each convolution kernel is a 5*5 matrix), and after convolutional processing is separately performed on the filled image block and the 96 convolution kernels, output of the first convolutional layer may be obtained, and may be recorded as first convolution output. The first convolution output includes 96 convolutional image blocks, and a size of each convolutional image block is 32*100. Subsequently, the 96 convolutional image blocks of the first convolution output may be used as input of a first pooling layer. That is, pooling processing (which may be the maximum pooling processing) is separately performed on each convolutional image block and pooling kernels of the first pooling layer, and corresponding first pooling output may be obtained. Specifically, a size of a pooling kernel of the pooling layer is 2*2 (that is, each pooling kernel is a 2*2 matrix), and the stepping thereof in row and column directions is 2*2. Specifically, a specific pooling processing may be as follows: a pooling kernel of 2*2 may respectively move from the convolutional image block according to the stepping of two pixel points in a horizontal direction and a vertical direction, a maximum of values of pixel points of the convolutional image block covered by the pooling kernel at each moving position of the is selected, and it can be obtained that a size of a pooling image block of first pooling output is 16*50. The first pooling output includes 96 pooling image blocks in total.

A periphery of the obtained pooling image block is filled with pixels with a specified grayscale value according to a preset range (for preventing a size of the pooling image block from being reduced after convolutional processing is performed on the pooling image block), so that a filled image block of the pooling image block may be obtained. The preset range may be additional 2 laps of pixel points on the periphery the pooling image block, a value of a pixel point may be 0, and the size of the filled image block of the pooling image block is 20*54. The obtained filled image block of the pooling image block may be used as input of a second convolutional layer (equivalent to a filled area of the second convolutional layer is 2*2). That is, convolutional processing is performed on the filled image block and a convolution kernel and an initial offset parameter of the second convolutional layer. Different convolution kernels correspond to different initial offset parameters, and the different convolution kernels and initial offset parameters are to-be-determined parameters included in the convolutional neural network model. Specifically, the second convolutional layer may include 256 convolution kernels, a size of each convolution kernel is 5*5 (that is, each convolution kernel is a 5*5 matrix), and after convolutional processing is separately performed on the 96 filled image blocks and the 256 convolution kernels, output of the second convolutional layer may be obtained, and may be recorded as second convolution output. Convolution may be performed on each filled image block and 256 convolution kernels. Each filled image block corresponds to 256 convolutional image blocks, and 256 convolution kernels corresponding to one of the 96 filled image blocks may be different from 256 convolution kernels corresponding to another one of the 96 filled image blocks. Then, 256 convolutional image blocks of the 96 filled image blocks are respectively added together. Finally, 256 convolutional image blocks may be obtained, and a size of each convolutional image block is 16*50. For example, a filled image block a corresponds to 256 convolutional image blocks, a filled image block b corresponds to 256 convolutional image blocks, and a filled image block c corresponds to 256 convolutional image blocks. First convolutional image blocks corresponding to a, b, and c are separately added together, and 256 convolutional image blocks are correspondingly added together in sequence, and finally, 256 convolutional image blocks are obtained. Subsequently, the 256 convolutional image blocks of the second convolution output may be used as input of a second pooling layer. That is, pooling processing (which may be the maximum pooling processing) is separately performed on each convolutional image block and pooling kernels of the second pooling layer, and corresponding second pooling output may be obtained. Specifically, a size of a kernel of the pooling layer is 2*2 (that is, each pooling kernel is a 2*2 matrix), the stepping thereof in row and column directions is 2*2, and the corresponding second pooling output may be obtained. The second pooling output includes 256 pooling image blocks in total, and a size of each pooling image block is 8*25.

According to the foregoing process, a third convolutional layer, a third pooling layer, a fourth convolutional layer, and a fourth pooling layer are passed through in sequence. Options of the third convolutional layer, the third pooling layer, the fourth convolutional layer, and the fourth pooling layer are similar to those of the second convolutional layer and the second pooling layer, both about using a pooling image block obtained in a previous layer as input of a present convolutional layer, then, expanding a boundary of the input pooling image block to obtain a filled image block, performing convolutional processing on the filled image block by using a convolution kernel and an initial offset parameter on the present layer to obtain a convolutional image block corresponding to the present layer, and subsequently, using the obtained convolutional image block as input of a next pooling layer to obtain a corresponding pooling image block. Specifically, the third convolutional layer and the fourth convolutional layer may separately include 512 convolution kernels and corresponding initial offset parameters. Different convolution kernels correspond to different initial offset parameters, and the different convolution kernels and initial offset parameters are to-be-determined parameters included in the convolutional neural network model. A size of each of the convolution kernels is 3*3, and filled areas of the third convolutional layer and the fourth convolutional layer are respectively 1*1. Sizes of pooling kernels of the third pooling layer and the fourth pooling layer are 2*2, and the stepping thereof in column and row directions is 2*1. According to the processing processes of the first convolutional layer, the first pooling layer, the second convolutional layer, and the second pooling layer, corresponding third convolution output can be obtained, and the third convolution output includes 512 convolutional image blocks in total. A size of each convolutional image block is 8*25, and the third pooling output includes 512 pooling image blocks in total. A size of each pooling image block is 4*24. Fourth convolution output includes 512 convolutional image blocks in total, and a size of each convolutional image block is 4*24. Fourth pooling output includes 512 pooling image blocks in total, and a size of each pooling image block is 2*23.

The 512 pooling images of the fourth pooling output may be used as input of a fifth convolutional layer. That is, convolutional processing is performed on the 512 pooling image blocks and a convolution kernel and an initial offset parameter of the fifth convolutional layer. Different convolution kernels correspond to different initial offset parameters, and the different convolution kernels and initial offset parameters are to-be-determined parameters included in the convolutional neural network model. Specifically, the fifth convolutional layer may include 512 convolution kernels, a size of each convolution kernel is 2*2 (that is, each convolution kernel is a 2*2 matrix), and after convolutional processing is separately performed on the 512 pooling image blocks and the 512 convolution kernels, output of the fifth convolutional layer may be obtained, and may be recorded as fifth convolution output. The fifth convolution output includes 512 convolutional image blocks, and a size of each convolutional image block is 1*22. The 512 convolutional image blocks having a size of 1*22 may be spread according to a pixel arrangement situation of each image, so that a feature vector having 11264 dimensions may be obtained.

The obtained feature vector may be used as input of a first linear hidden layer. The first linear hidden layer has 4096 nodes in total. Linear calculation is performed on the obtained feature vector by using a parameter of the first linear hidden layer, so that first linear hidden layer output can be obtained. A quantity of dimensions of a vector of the first linear hidden layer output is 4096, and processing of the first linear hidden layer is equivalent to multiplying a matrix having a size of 4096*11264 by a feature vector having 11264 dimensions, to obtain the first linear hidden layer output and the vector having a size of 4096. Subsequently, normalization is performed on the first linear hidden layer output, and a specific process of the normalization is: calculating an average and a variance of the first linear hidden layer output, which may be reducing a numeral of each dimension in the first linear hidden layer output by the average corresponding to the first linear hidden layer output and dividing a result by the variance, that is, normalization may be performed on the first linear hidden layer output.

The normalized first linear hidden layer output is used as input of a second linear hidden layer. The second linear hidden layer has 4096 nodes in total. Linear calculation is performed on the obtained first linear hidden layer output by using a parameter of the second linear hidden layer, so that second linear hidden layer output can be obtained. A quantity of dimensions of a vector of the second linear hidden layer output is 4096, and then, the second linear hidden layer output is normalized. The normalized second linear hidden layer output is used as input of a third linear hidden layer. The third linear hidden layer has 925 nodes in total. Linear calculation is performed on the obtained second linear hidden layer output by using a parameter of the third linear hidden layer, so that third linear hidden layer output can be obtained. A quantity of dimensions of a vector of the third linear hidden layer output is 925. That is, an expression of a first feature vector corresponding to the sample image is obtained. Subsequently, the first feature vector may be marticulated (a 925-dimension vector may be divided every 25 dimensions, and then, is added into a matrix of 37*25 row by row, or a 925-dimension vector may be divided every 37 dimensions, and then, is added into a matrix of 37*25 column by column) and may be converted into a probability set of 37*25, where 37 is a quantity of preset characters, and 25 is a quantity of preset character positions.

Softmax softening processing may be performed on element values of each column in the probability set having a size of 37*25, so that an expression of a probability set corresponding to a sample image block can be obtained. In a calculation process of the obtained expression of the probability set, a size of a convolution kernel of each involved convolutional layer, a size of a pooling kernel of each pooling layer, and a quantity of nodes of each linear hidden layer may be set freely. This embodiment only provides a description on a probability set having a size of 37*25 that can be obtained.

Operation 102: According to the expression of the probability set, based on a training target of maximizing a probability that the character string recognition result determined according to the probability set is the character string included in the pre-stored sample image block, train the plurality of to-be-determined parameters to obtain a training value for each to-be-determined parameter.

During implementation, after obtaining an expression of a probability set corresponding to a specific pre-stored sample image block, the server may construct, according to the expression of the probability set, an expression of a probability that a character string included in a sample image block can be recognized from the sample image block, and based on a training target of maximizing a value of the expression, trains a plurality of to-be-determined parameters of a convolutional neural network algorithm by using a gradient descent method, where the plurality of to-be-determined parameters are a convolution kernel of each of the foregoing convolutional layers, a corresponding initial offset parameter, and a parameter of each linear hidden layer, and obtains a training value for each to-be-determined parameter corresponding to the sample image block. During an entire training process, a final training value of each to-be-determined parameter may be obtained according to a manner 1. That is, expressions of probability sets of all pre-stored sample image blocks may be obtained in sequence, so that each to-be-determined parameter may have training values of a quantity which is the same as that of the pre-stored sample image blocks, an average of the plurality of training values may be obtained by calculation and used as a final training value of each to-be-determined parameter. In addition, a final training value of the to-be-determined parameter may be obtained according to a manner 2. That is, a training value corresponding to one of the sample image blocks may be used as an initial value when a next sample image block is used as training data to obtain a corresponding to-be-determined parameter, and recursion is performed in sequence. After all of the pre-stored sample image blocks are trained, a training value corresponding to each to-be-determined parameter is obtained. Alternatively, the pre-stored sample image blocks may be grouped, for sample image blocks in each group, a training value of each to-be-determined parameter may be obtained according to the method in the manner 1, and between the groups, a training value of each to-be-determined parameter may be obtained according to the method in the manner 2. After all groups of sample image blocks are trained, a final training value of each to-be-determined parameter is obtained.

In some embodiments, to obtain the training value of each to-be-determined parameter, a target function of training may be first determined, the training is performed based on the target function, and correspondingly, a processing process of operation 102 may be as follows: determining, based on the expression of the probability set, a probability function of constituting the character string included in the pre-stored sample image block by using characters at the preset quantity of character positions; and using the probability function as a target function and training the plurality of to-be-determined parameters based on a training target of maximizing a value of the target function, to obtain a training value for each to-be-determined parameter.

During implementation, after obtaining the expression of the probability set corresponding to the sample image block, that is, obtaining a probability matrix, the server may determine, according to the probability matrix, that I, the foregoing matrix having a size of 37*25, that characters in each column of the probability matrix may be combined into a probability function of the character string included in the sample image block, and may use the probability function as a target function and train the target function by using the gradient descent method, that is, a value of each to-be-determined parameter corresponding to maximizing a value of the target function is obtained as the training value of the to-be-determined parameter. In addition, after the probability function is obtained, negative logarithm may be performed on the obtained probability function (which may be referred to as a loss function), the lass function may be used as a target function, and the target function is trained by using the gradient descent method, that is, a value of each to-be-determined parameter corresponding to minimizing a value of the target function is obtained as the training value of the to-be-determined parameter.

In some embodiments, to obtain the probability function, all character strings that can be combined into the character string included in the sample image block may be obtained, and correspondingly, a processing process may be as follows: determining a character string whose quantity of characters is the preset quantity and that satisfies a preset character feature condition, where the preset character feature condition is that after combination of adjacent repeated characters and blank space character removal are performed, the character string included in the pre-stored the sample image block can be obtained; determining, based on the expression of the probability set, a probability expression corresponding to each character string whose quantity of characters is the preset quantity and that satisfies the preset character feature condition; and performing summation on the determined probability expressions to obtain a probability function.

During implementation, the server determines a character string whose quantity of character positions is a preset quantity (for example, 25), that is constituted by preset characters, and that satisfies a preset character feature condition, and determines that characters in each column of the probability matrix may be combined into a character string included in the sample image block. The preset character feature condition is that after combination of adjacent repeated characters and blank space character removal are performed, the character string included in the pre-stored sample image block can be obtained (which may be referred to as mapping), that is, a character string from which it is determined that the character string included in the sample image block may be obtained by mapping, for example, a character string cat may be obtained by mapping one of character strings ccat, c_att, ca_t, and cat, where "_" represents a blank space. A probability expression corresponding to each character string may be obtained based on the expression of the probability set, and after the probability expression of each character string that satisfies the condition is determined, summation may be performed on the determined probability expressions to obtain a probability function. A meaning represented by adding up all of the probability expressions is adding up probability expressions corresponding to all of the character strings from which "cat" may be obtained by means of mapping, and a final probability function, namely, the target function, is obtained.

In some embodiments, when the probability expression corresponding to the character string is determined, multiplication may be performed on probability expressions of each character at corresponding character positions and corresponding processing may be as follows: for each character string whose quantity of characters is the preset quantity and that satisfies the preset character feature condition, searching the expression of the probability set, for a probability expression of each character in the character string at a corresponding character position, and performing multiplication on all the found probability expressions, to obtain a probability expression corresponding to the character string.

Figure 2:
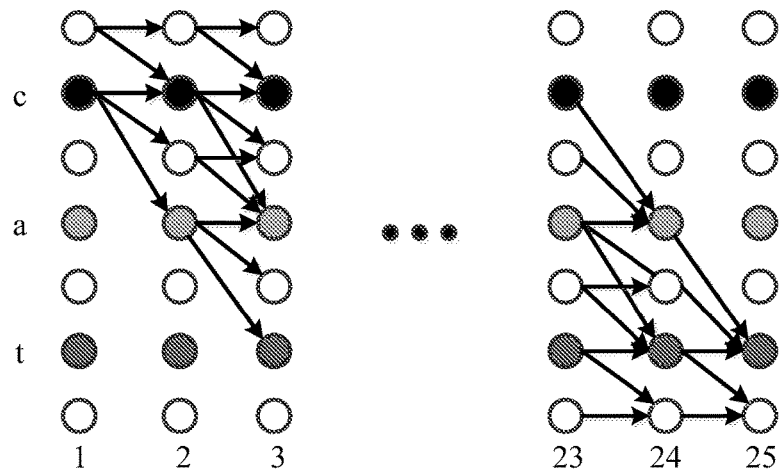
FIG. 2 is a schematic diagram of a determined character string according to an embodiment of this disclosure.

During implementation, the preset character feature condition is that after combination of adjacent repeated characters and blank space character removal are performed, the character string included in the pre-stored the sample image block can be obtained (which may be referred to as mapping). For each character string whose quantity of characters is the preset quantity and that satisfies the preset character feature condition, the server may search the expression of the probability set, for a probability expression of each character in the character string at a corresponding character position, and then, perform multiplication on all the found probability expressions, to obtain a probability expression corresponding to the character string. For example, a probability expression corresponding to a character string "ccat" may be obtained by performing multiplication on a probability expression whose character at the first character position is "c", a probability expression whose character at the second character position is "c", a probability expression whose character at the third character position is "a", and a probability expression whose character at the fourth character position is "t", that is, performing multiplication on element values at corresponding positions in the probability matrix, that is, $a_{3,1} \cdot a_{3,2} \cdot a_{1,3} \cdot a_{20,4}$. For a case in which a quantity of preset character positions is 25 in this embodiment, as shown in FIG. 2, a character string that satisfies a preset character feature condition is a combination of characters corresponding to character positions from the first character position to the $25^{th}$ character position indicated in FIG. 2. That is, in FIG. 2, a combination of characters included in a path involved in each combination of arrows from the first character position to the $25^{th}$ character position is a character string that satisfies the preset character feature condition. Using a group of arrows as an example, it could be seen that one of the character strings is that: characters at character positions from the first character position to the $22^{nd}$ character position are blank space characters, a character at the $23^{rd}$ character position is "c", a character at the $24^{th}$ character position is "a", and a character at the $25^{th}$ character position is "t". Because probability distributions of characters at different character positions are mutually independent, multiplication may be performed on probability expressions corresponding to blank space characters in the first to 22$^{nd}$ columns and probability expressions respectively corresponding to characters "c", "a", and "t" in the 23$^{rd}$, 24$^{th}$, and 25$^{th}$ columns to obtain a probability expression corresponding to the character string.

In addition, when a target function is determined based on the expression of the probability set, the target function may be obtained by means of the dynamic programming algorithm. The dynamic programming algorithm may be used to avoid a problem of enumerating all paths. The method for calculating a probability function by using the dynamic programming algorithm may be specifically as follows:

First, a forward variable matrix A and a backward variable matrix B are set. Quantities of rows of matrices A and B may be two times a length of a character string included in a sample image block plus 1. Quantities of columns are a preset quantity of character positions. That is, if a character string included in the sample image block is represented by l, and the length is represented by p, quantities of rows of the matrices A and B are 2*p+1 (because a blank space character may exist in a character string whose quantity of character positions is a preset quantity and satisfies a preset character feature condition (which may be referred as a character string that satisfies a condition), it is necessary to add a blank space character between every two character positions in a character string that needs to be recognized, for example, when a character string that needs to be recognized is "cat", all character strings that satisfy the condition may be obtained from the matrix shown in FIG. 2, and characters in each column are obtained by adding a blank space between every two characters). $A_{s,t}$ indicates an expression of a probability sum of all sub-character strings of the character string included in the sample image block from the first character position to the t$^{th}$ character position that can be obtained by mapping (which may be referred to as a front part), and $B_{s,t}$ indicates an expression of a probability sum of all sub-character strings of the character string included in the sample image block from the 25$^{th}$ character position to the t$^{th}$ character position that can be obtained by mapping (which may be referred to as a rear part). The matrices A and B may be initialized. A value of $A_{1,1}$ may be set to a probability that a character at the first character position in a character string that satisfies a condition is a blank space character, that is, $a_{37,1}$ in a probability matrix, and a value of $A_{2,1}$ is a probability that a character at the first character position in a character string that satisfies a condition is a character at the first character position in a to-be-recognized character string. Using "cat" as an example, $A_{2,1}$ is $a_{3,1}$ in the probability matrix, and the rest is 0. A value of $B_{2*p+1,25}$ may be set to a probability that a character at the 25$^{th}$ character position in a character string that satisfies a condition is a blank space character, that is, $a_{37,25}$ in a probability matrix, and a value of $B_{2*p,25}$ is a probability that a character at the 25$^{th}$ character position in a character string that satisfies a condition is a character at the last character position in a to-be-recognized character string. Using "cat" as an example, $B_{2*p,25}$ is $a_{26,25}$ in the probability matrix, and the rest is 0. A value corresponding to the matrix A may be obtained by iteration according to formula (1), and a value corresponding to the matrix B may be obtained by iteration according to formula (2):

$$A_{s,t} = p^{t}_{l_{\lfloor s/2 \rfloor}} * \begin{cases} (A_{s,t-1} + A_{s-1,t-1}), & l_{\lfloor s/2 \rfloor} = ''\_'' l_{\lfloor s/2 \rfloor} = l_{\lfloor s/2 \rfloor - 1} \\ (A_{s,t-1} + A_{s-1,t-1} + A_{s-2,t-1}) \end{cases} \quad (1)$$

-continued $$B_{s,t} = p^{t}_{l_{\lfloor s/2 \rfloor}} * \begin{cases} (B_{s,t+1} + B_{s+1,t+1}), & l_{\lfloor s/2 \rfloor} = ''\_'' l_{\lfloor s/2 \rfloor} = l_{\lfloor s/2 \rfloor + 1} \\ (B_{s,t+1} + B_{s+1,t+1} + B_{s+2,t+1}) \end{cases} \quad (2)$$

$p^{t}_{l_{\lfloor s/2 \rfloor}}$ represents a probability that a character at the t$^{th}$ character position of the character is a character corresponding to the character position after s/2 in the character string l is rounded down. For example, $p^{t}_{l_1}$ represents a probability that a character at the t$^{th}$ character position is a character at the first character position in l. Using "cat" as an example, $p^{t}_{l_1}$ presents a probability that a character at the t$^{th}$ character position is the character "c". "_" represents a blank space character. $A_{s,t}$ indicates a probability sum of all arrows pointed at a character corresponding to the s$^{th}$ row at the t$^{th}$ character position. For example, a value of $A_{1,2}$ is a product of multiplying $A_{1,1}$ by a probability that a character at the 2$^{nd}$ character position of the character string that satisfies the condition is a blank space character, a value of $A_{2,2}$ is a product of multiplying a sum of $A_{2,1}$ and $A_{1,1}$ by a probability that a character at the 2$^{nd}$ character position of the character string that satisfies the condition is the character "c", and recursion is performed in sequence to obtain the value of the matrix A. During the recursion process, if a value does not exist in the matrix A, a value corresponding to the value may be considered to be 0. For example, $A_{0,1}$ does not exist in the matrix A, and if during the recursion process, $A_{0,1}$ appears, it could be considered that a value of $A_{0,1}$ is 0. A process of obtaining a value of the matrix B is similar to the process of obtaining a value of the matrix A and the only difference is that when the value of the matrix B is calculated, the calculation is performed in a reverse direction from t which is 25. After the matrices A and B are obtained, values at each position of the matrix A and the matrix B are correspondingly multiplied together, and all products are added together, so that a probability function corresponding to the sample image block is obtained. Correspondingly multiplying values at each position together is multiplying a sub-character string of a front part ended with the character by a sub-character string of a rear part started with the character, and after the multiplication, all character strings including the character at the character position among the character strings that satisfy the condition are obtained.

Operation 103: When a to-be-recognized target image block is obtained, determine, based on the convolutional neural network algorithm and the training values of the plurality of to-be-determined parameters, a target probability set corresponding to the target image block, and determine, according to the target probability set, a character string recognition result of the target image block.

During implementation, after obtaining the training value of the to-be-determined parameter, the server may substitute the training value of each to-be-determined parameter into a convolutional neural network algorithm, so as to obtain a convolutional neural network method having a determined parameter. The server may recognize a character string that is included in the target image block and that has a maximum length of a preset quantity (which may be 25) by using the convolutional neural network model. A size of the target image block is the same as a size of the sample image block, and if a size of the obtained target image block is different from the size of the sample image block, the target image block may be scaled up or down, so that the size of the target image block is the same as that of the sample image block. The server may use the obtained target image block as input of the convolutional neural network model, and obtain a target probability set corresponding to the target image block according to the foregoing operations. Using 37*25 as an example, the server may obtain a target probability matrix having a size of 37*25. The server may obtain a character string included in the target image block according to the obtained target probability set, that is, a character string recognition result corresponding to the target image block.

In some embodiments, the training value of each to-be-determined parameter may be substituted into the convolutional neural network algorithm to determine a target probability set corresponding to a target image block, and corresponding processing may be as follows: when the to-be-recognized target image block is obtained, based on the training value of each to-be-determined parameter of the convolutional neural network algorithm, performing convolutional processing for a first preset quantity of times, pooling processing for a second preset quantity of times, and linear processing for a third preset quantity of times on the target image block to obtain an expression of a corresponding second feature vector, and performing softening processing on the expression of the second feature vector and constructing a target probability set corresponding to the character string recognition result of the sample image block.

During implementation, after obtaining the training value of the to-be-determined parameter, the server may obtain a to-be-recognized target image block and obtain a size of the sample image block. If a size of the obtained target image block is the same as the size of the sample image block, the size of the target image block is not processed, and if the size of the obtained target image block is different from the size of the sample image block, the target image block may be scaled up or down, so that the size of the target image block is the same as that of the sample image block. The to-be-determined parameter includes a convolution kernel of each convolutional layer, a corresponding initial offset parameter, and a parameter of each linear hidden layer, and after obtaining a training value of a convolution kernel of each convolutional layer, a training value of a corresponding initial offset parameter, and a training value of a parameter of each linear hidden layer, the server may correspondingly substitute them into each convolutional layer and linear hidden layer. The server may use the target image block as input of the first convolutional layer, perform convolutional processing for a first preset quantity of times, pooling processing for a second preset quantity of times, and linear processing for a third preset quantity of times on the target image block (which is the same as the processing in operation 101 and is not described herein in detail again), and may obtain a second feature vector expression corresponding to the target image block. Then, the server may perform softening processing on the second feature vector expression (which is the same as the softening processing in operation 101 and is not described herein in detail again) and may obtain a target probability set corresponding to the target image block.

In some embodiments, a preset character having a maximum probability at each character position in the probability set may be used as a character at the character position, and correspondingly, a processing process may be as follows: determining, according to the target probability set, a preset character having a maximum probability at each character position included in the preset quantity of character positions; and determining the character string recognition result of the target image block according to the preset character having the maximum probability at each character position included in the preset quantity of character positions.

During implementation, after obtaining a target probability set corresponding to the target image block and a target probability matrix, the server may select, according to the target probability matrix, preset characters corresponding to maximum probabilities in each column of the target probability matrix and then, use a character string constituted by the selected preset characters having maximum probabilities at character positions as a character string recognition result of the target image block.

In some embodiments, combination of adjacent repeated characters and blank space character removal may be performed on the determined character string to obtain a character string recognition result of the target image block, and corresponding processing may be as follows: combining the preset characters having the maximum probabilities at the character positions included in the preset quantity of character positions into a target character string; and performing combination of adjacent repeated characters and blank space character removal on the target character string, to obtain the character string recognition result of the target image block.

During implementation, after obtaining a target probability set corresponding to the target image block and a target probability matrix, the server may select, according to the target probability matrix, preset characters corresponding to maximum probabilities in each column of the target probability matrix, combine the preset characters in each column into a target character string, and then, perform the foregoing mapping processing on the target character string, that is, performing combination of adjacent repeated characters and blank space character removal on the target character string, and a character string obtained by performing the mapping processing on the target character string is the character string recognition result of the target image block.

In some embodiments, a plurality of candidate character strings may be preset, a probability of forming each candidate character string is determined by using the target probability set, and a character string having a maximum probability is used as the character string recognition result of the target image block. Correspondingly, a processing process may be as follows: determining, according to the target probability set, a probability of forming each candidate character string by combining the characters at the preset quantity of character positions, and using a candidate character having a maximum probability as the character string recognition result of the target image block.

The character string may be a character string that may be included in the target image block. A candidate character string may be a combination of common characters that are preset by technical personnel and is stored in the server.

During implementation, in some cases, before the character string included in the target image block is recognized, it may be learned that the character string included in the target image block is one of some character strings (that is, candidate character strings). When a corresponding candidate character string in the target image block is learned, a probability of obtaining a particular character string from a target probability set is determined according to a method for determining a probability function corresponding to a character string included in a sample image block according to an expression of the probability set and according to a target probability set corresponding to a target image. After probability corresponding to the candidate character strings are obtained, a candidate character string having a maximum probability is used as a character string included in a target image block, that is, a character string recognition result.

In the embodiments of this disclosure, according to image data of a sample image block that is stored in a training sample library and that includes a character string, and based on a convolutional neural network algorithm, an expression of a probability set corresponding to a character string recognition result of the sample image block is constructed, the expression of the probability set being constituted by a plurality of to-be-determined parameters of the convolutional neural network algorithm, and probabilities included in the probability set being individually used for indicating a probability that a character at any character position of a preset quantity of character positions is any character of a plurality of preset characters; according to the expression of the probability set, based on a training target of maximizing a probability that the character string recognition result determined according to the probability set is the character string included in the pre-stored sample image block, the to-be-determined parameter is trained to obtain a training value for each to-be-determined parameter; and when a to-be-recognized target image block is obtained, a target probability set corresponding to the target image block is determined based on the convolutional neural network algorithm and the training values of the plurality of to-be-determined parameters, and a character string recognition result of the target image block is determined according to the target probability set. In this way, a character string in a target image block can be directly recognized without first dividing the character string character by character and then, recognizing a single character after the division. That is, a recognition result is no longer dependent on a division result, so that correctness of character string recognition can be improved.

Figure 3:
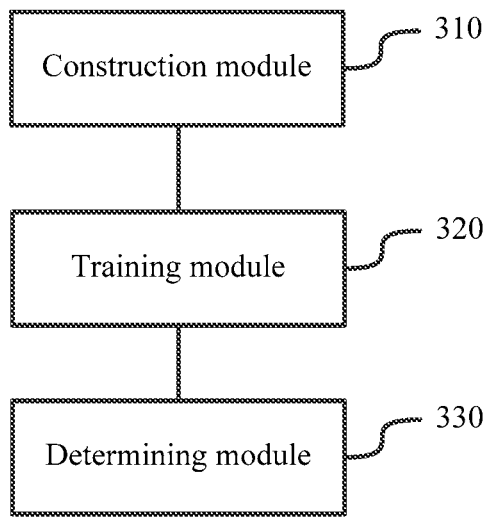
FIG. 3 is a schematic structural diagram of an apparatus for recognizing a character string in an image according to an embodiment of this disclosure.

Based on the same technical concept, the embodiments of this disclosure further provide an apparatus for recognizing a character string in an image is provided. As shown in FIG. 3, the apparatus includes:

a construction module 310, configured to: according to image data of a pre-stored sample image block including a character string, and based on a convolutional neural network algorithm, construct an expression of a probability set corresponding to a character string recognition result of the sample image block, the expression of the probability set being constituted by a plurality of to-be-determined parameters of the convolutional neural network algorithm, and probabilities included in the probability set being individually used for indicating a probability that a character at any character position of a preset quantity of character positions is any character of a plurality of preset characters;

a training module 320, configured to: according to the expression of the probability set, based on a training target of maximizing a probability that the character string recognition result determined according to the probability set is the character string included in the pre-stored sample image block, train the plurality of to-be-determined parameters to obtain a training value for each to-be-determined parameter; and a determining module 330, configured to: when a to-be-recognized target image block is obtained, determine, based on the convolutional neural network algorithm and the training values of the plurality of to-be-determined parameters, a target probability set corresponding to the target image block, and determine, according to the target probability set, a character string recognition result of the target image block.

Figure 4:
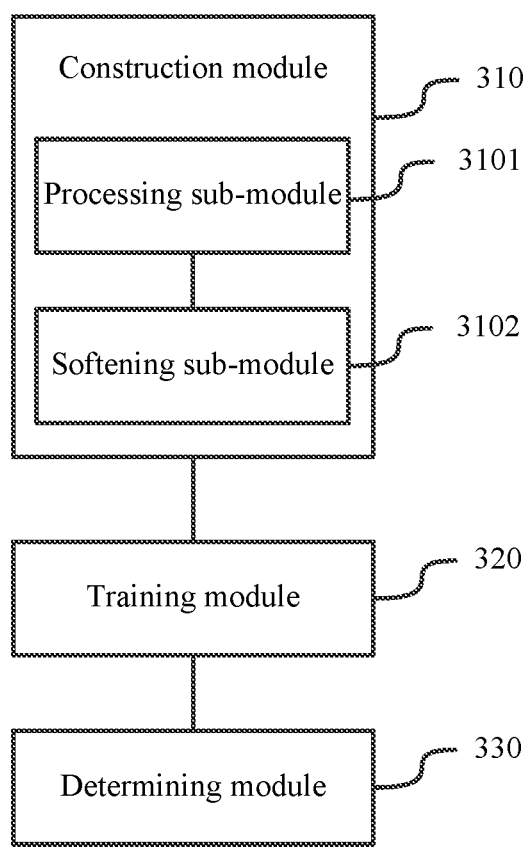
FIG. 4 is a schematic structural diagram of an apparatus for recognizing a character string in an image according to an embodiment of this disclosure.

In some embodiments, as shown in FIG. 4, the construction module 310 includes:

a processing sub-module 3101, configured to perform convolutional processing for a first preset quantity of times, pooling processing for a second preset quantity of times, and linear processing for a third preset quantity of times on the image data of the sample image block to obtain an expression of a corresponding first feature vector; and a softening sub-module 3102, configured to perform softening processing on the expression of the first feature vector and construct the expression of the probability set corresponding to the character string recognition result of the sample image block.

Figure 5:
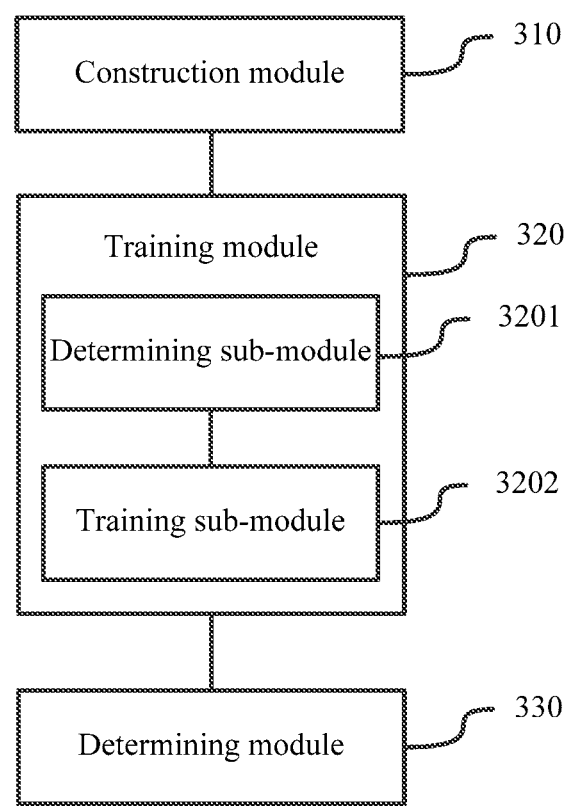
FIG. 5 is a schematic structural diagram of an apparatus for recognizing a character string in an image according to an embodiment of this disclosure.

In some embodiments, as shown in FIG. 5, the training module 320 includes:

a determining sub-module 3201, configured to determine, based on the expression of the probability set, a probability function of constituting the character string included in the pre-stored sample image block by using characters at the preset quantity of character positions; and a training sub-module 3202, configured to use the probability function as a target function and train the to-be-determined parameter based on a training target of maximizing a value of the target function, to obtain a training value for each to-be-determined parameter.

Figure 6:
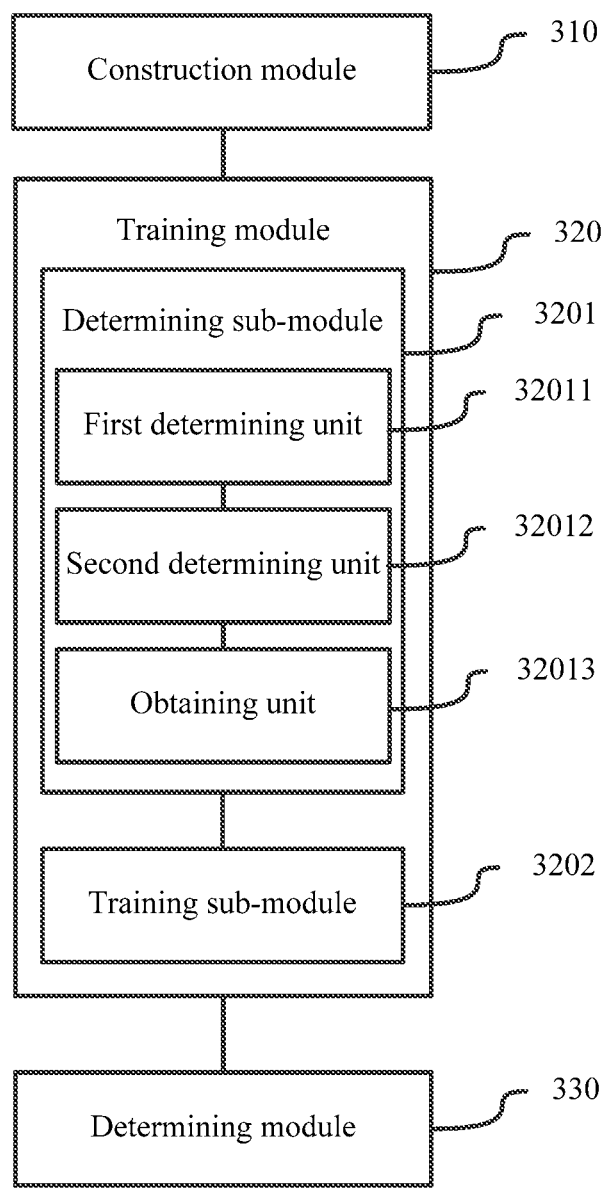
FIG. 6 is a schematic structural diagram of an apparatus for recognizing a character string in an image according to an embodiment of this disclosure.

In some embodiments, as shown in FIG. 6, the determining sub-module 3201 includes:

a first determining unit 32011, configured to determine a character string whose quantity of characters is the preset quantity and that satisfies a preset character feature condition, wherein the preset character feature condition is that after combination of adjacent repeated characters and blank space character removal are performed, the character string included in the pre-stored the sample image block can be obtained;

a second determining unit 32012, configured to determine, based on the expression of the probability set, a probability expression corresponding to each character string whose quantity of characters is the preset quantity and that satisfies the preset character feature condition; and an obtaining unit 32013, configured to perform summation on the determined probability expressions to obtain a probability function.

In some embodiments, the second determining unit 33012 is configured to:

for each character string whose quantity of characters is the preset quantity and that satisfies the preset character feature condition, search the expression of the probability set, for a probability expression of each character in the character string at a corresponding character position, and perform multiplication on all the found probability expressions, to obtain a probability expression corresponding to the character string.

In some embodiments, the determining module 330 is configured to:

determine, according to the target probability set, a preset character having a maximum probability at each character position included in the preset quantity of character positions, and form a target character string; and determine the character string recognition result of the target image block according to the preset character having the maximum probability at each character position included in the preset quantity of character positions.

Figure 7:
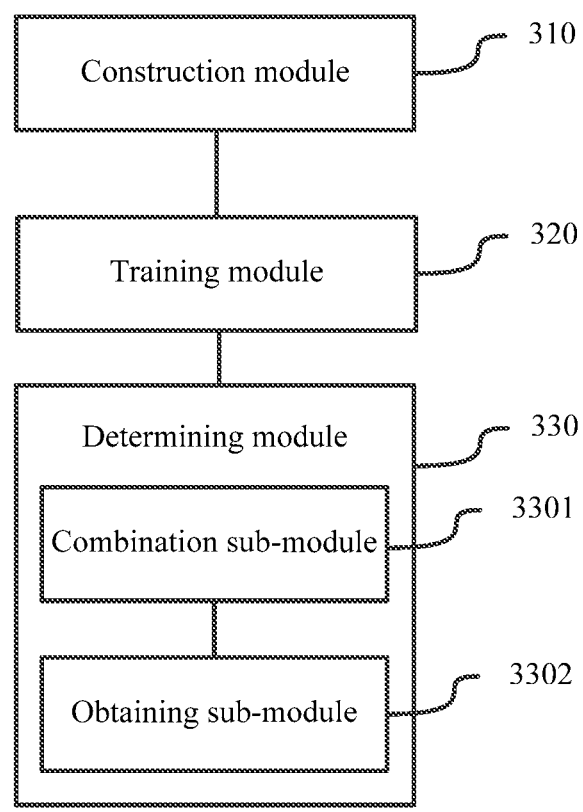
FIG. 7 is a schematic structural diagram of an apparatus for recognizing a character string in an image according to an embodiment of this disclosure.

In some embodiments, as shown in FIG. 7, the determining module 330 includes:

a combination sub-module 3301, configured to combine the preset characters having the maximum probabilities at the character positions included in the preset quantity of character positions into a target character string; and an obtaining sub-module 3302, configured to perform combination of adjacent repeated characters and blank space character removal on the target character string, to obtain the character string recognition result of the target image block.

In some embodiments, the determining module 330 is configured to:

determine, according to the target probability set, a probability of forming each candidate character string by combining the characters at the preset quantity of character positions, and using a candidate character having a maximum probability as the character string recognition result of the target image block.

In some embodiments, the determining module 330 is configured to:

when the to-be-recognized target image block is obtained, based on the training value of each to-be-determined parameter of the convolutional neural network algorithm, perform convolutional processing for a first preset quantity of times, pooling processing for a second preset quantity of times, and linear processing for a third preset quantity of times on the target image block to obtain an expression of a corresponding second feature vector, and perform softening processing on the expression of the second feature vector and constructing a target probability set corresponding to the character string recognition result of the sample image block.

In the embodiments of this disclosure, according to image data of a sample image block that is stored in a training sample library and that includes a character string, and based on a convolutional neural network algorithm, an expression of a probability set corresponding to a character string recognition result of the sample image block is constructed, the expression of the probability set being constituted by a plurality of to-be-determined parameters of the convolutional neural network algorithm, and probabilities included in the probability set being individually used for indicating a probability that a character at any character position of a preset quantity of character positions is any character of a plurality of preset characters; according to the expression of the probability set, based on a training target of maximizing a probability that the character string recognition result determined according to the probability set is the character string included in the pre-stored sample image block, the to-be-determined parameter is trained to obtain a training value for each to-be-determined parameter; and when a to-be-recognized target image block is obtained, a target probability set corresponding to the target image block is determined based on the convolutional neural network algorithm and the training values of the plurality of to-be-determined parameters, and a character string recognition result of the target image block is determined according to the target probability set. In this way, a character string in a target image block can be directly recognized without first dividing the character string character by character and then, recognizing a single character after the division. That is, a recognition result is no longer dependent on a division result, so that correctness of character string recognition can be improved.

It should be noted that, when the apparatus for recognizing a character string in an image provided in the foregoing embodiments recognizes a character string in an image, division of the respective functional modules is only used as an example for description. In actual application, the foregoing functions may be implemented by different functional modules by means of allocation according to requirements, that is, an internal structure of the device is divided into different functional modules to implement all or some of the described-above functions. In addition, the apparatus for recognizing a character string in an image provided in the foregoing embodiments and the embodiments of the method for recognizing a character string in an image belong to the same concept. For the specific implementation process, refer to the method embodiments, and the details are not described herein again.

Figure 8:
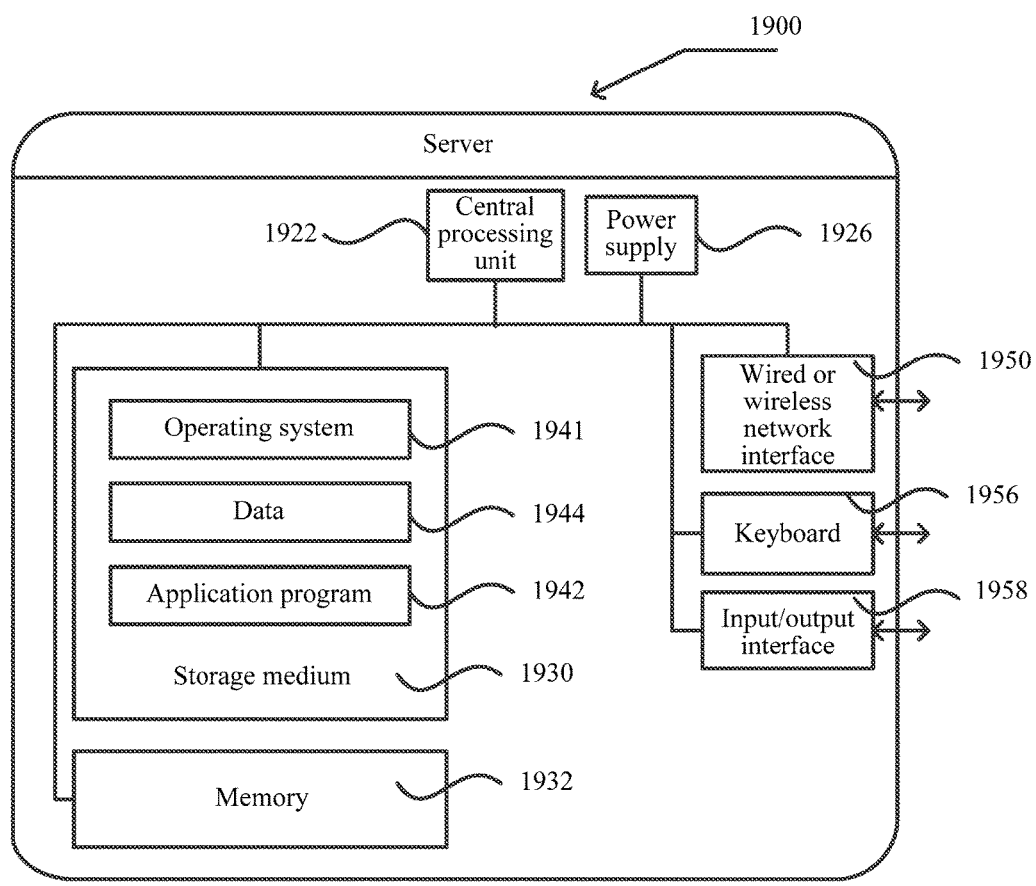
FIG. 8 is a structural schematic diagram of a server according to an embodiment of the present disclosure.

FIG. 8 is a structural schematic diagram of a server according to an embodiment of the present disclosure. The server 1900 may greatly differ as configuration or performance differs, may include one or more central processing units (CPUs) 1922 (for example, one or more processors), a memory 1932, and one or more storage mediums 1930 storing an application program 1942 or data 1944 (for example, one or more mass storage devices). The memory 1932 and the storage medium 1930 may perform temporary storage or persistent storage. A program stored in the storage medium 1930 may include one or more modules (not marked in the figure), and each module may include a series of instructions or operations on a statistics server. Further, the CPU 1922 may be configured to communicate with the storage medium 1930, and perform a series of instructions or operations in the storage medium 1930 on the statistics server 1900.

The server 1900 may further include one or more power supplies 1926, one or more wired or wireless network interfaces 1950, one or more input/output interfaces 1958, one or more keyboards 1956, and/or one or more operating systems 1941 such as Windows Server™, Mac OS X™, Unix™, Linux™, and FreeBSD™.

The server 1900 may include a memory and one or more programs. The one or more programs are stored in the memory, and one or more processors are configured to perform the method for recognizing a character string in an image in the foregoing embodiments by executing the foregoing programs.

In an example of an embodiment, a non-transitory computer readable storage medium including an instruction, such as a memory including an instruction, is further provided, and the instruction may be executed by the processor of the server to complete the method for recognizing a character string in an image. For example, the non-volatile computer readable storage medium may be a Read-Only Memory (ROM), a Random-Access Memory (RAM), a Compact Disc Read-Only Memory (CD-ROM), a magnetic tape, a soft disk, an optical data storage device, and the like.

In the embodiments of this disclosure, according to image data of a sample image block that is stored in a training sample library and that includes a character string, and based on a convolutional neural network algorithm, an expression of a probability set corresponding to a character string recognition result of the sample image block is constructed, the expression of the probability set being constituted by a plurality of to-be-determined parameters of the convolutional neural network algorithm, and probabilities included in the probability set being individually used for indicating a probability that a character at any character position of a preset quantity of character positions is any character of a plurality of preset characters; according to the expression of the probability set, based on a training target of maximizing a probability that the character string recognition result determined according to the probability set is the character string included in the pre-stored sample image block, the to-be-determined parameter is trained to obtain a training value for each to-be-determined parameter; and when a to-be-recognized target image block is obtained, a target probability set corresponding to the target image block is determined based on the convolutional neural network algorithm and the training values of the plurality of to-be-determined parameters, and a character string recognition result of the target image block is determined according to the target probability set. In this way, a character string in a target image block can be directly recognized without first dividing the character string character by character and then, recognizing a single character after the division. That is, a recognition result is no longer dependent on a division result, so that correctness of character string recognition can be improved.

Persons of ordinary skill in the art may understand that all or some of the operations of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

The foregoing descriptions are merely preferred embodiments of this disclosure, but are not intended to limit this disclosure. Any modification, equivalent replacement, or improvement made without departing from the spirit and principle of this disclosure should fall within the protection scope of this disclosure.

What is claimed is:

1. A method for recognizing a character string in an image performed at a computing device having one or more processors and memory storing one or more programs to be executed by the one or more processors, the method comprising:

constructing an expression of a probability set corresponding to a character string recognition result of a pre-stored sample image block of a character string based on a convolutional neural network algorithm, the expression of the probability set being constituted by a plurality of to-be-determined parameters of the convolutional neural network algorithm, and probabilities in the probability set used for indicating a probability that a character at one of a preset quantity of character positions is one of a plurality of preset characters;

training the plurality of to-be-determined parameters to obtain a training value for each to-be-determined parameter based on a training target of maximizing a probability that the character string recognition result determined according to the probability set is the character string comprised in the pre-stored sample image block;

obtaining a to-be-recognized target image block;

calculating, based on the convolutional neural network algorithm and the training values of the plurality of to-be-determined parameters, a target probability set corresponding to the target image block; and determining, according to the target probability set, a character string recognition result of the target image block.

2. The method according to claim 1, wherein the operation of constructing an expression of a probability set corresponding to a character string recognition result of a pre-stored sample image block of a character string based on a convolutional neural network algorithm comprises:

performing convolutional processing for a first preset quantity of times, pooling processing for a second preset quantity of times, and linear processing for a third preset quantity of times on the image data of the sample image block to obtain an expression of a corresponding first feature vector; and performing softening processing on the expression of the first feature vector and constructing the expression of the probability set corresponding to the character string recognition result of the sample image block.

3. The method according to claim 1, wherein the operation of training the plurality of to-be-determined parameters to obtain a training value for each to-be-determined parameter comprises:

determining, based on the expression of the probability set, a probability function of constituting the character string comprised in the pre-stored sample image block by using characters at the preset quantity of character positions; and using the probability function as a target function and training the plurality of to-be-determined parameters based on a training target of maximizing a value of the target function, to obtain a training value for each to-be-determined parameter.

4. The method according to claim 3, wherein the operation of determining, based on the expression of the probability set, a probability function of constituting the character string comprised in the pre-stored sample image block by using characters at the preset quantity of character positions comprises:

determining a character string whose quantity of characters is the preset quantity and that satisfies a preset character feature condition, wherein the preset character feature condition is that the character string comprised in the pre-stored the sample image block is obtained after combination of adjacent repeated characters and removal of blank space characters;

determining, based on the expression of the probability set, a probability expression corresponding to each character string whose quantity of characters is the preset quantity and that satisfies the preset character feature condition; and performing summation on the determined probability expressions to obtain a probability function.

5. The method according to claim 4, wherein the operation of determining, based on the expression of the probability set, a probability expression corresponding to each character string whose quantity of characters is the preset quantity and that satisfies the preset character feature condition comprises:

for each character string whose quantity of characters is the preset quantity and that satisfies the preset character feature condition, searching the expression of the probability set, for a probability expression of each character in the character string at a corresponding character position, and performing multiplication on all the found probability expressions, to obtain a probability expression corresponding to the character string.

6. The method according to claim 1, wherein the operation of determining, according to the target probability set, a character string recognition result of the target image block comprises:

separately determining, according to the target probability set, a preset character having a maximum probability at each character position comprised in the preset quantity of character positions; and determining the character string recognition result of the target image block according to the preset character having the maximum probability at each character position comprised in the preset quantity of character positions.

7. The method according to claim 6, wherein the operation of determining the character string recognition result of the target image block according to the preset character having the maximum probability at each character position comprised in the preset quantity of character positions comprises:
  combining the preset characters having the maximum probabilities at the character positions comprised in the preset quantity of character positions into a target character string; and
  performing combination of adjacent repeated characters and blank space character removal on the target character string, to obtain the character string recognition result of the target image block.

8. The method according to claim 1, wherein the operation of determining, according to the target probability set, a character string recognition result of the target image block comprises:
  determining, according to the target probability set, a probability of forming each candidate character string by combining the characters at the preset quantity of character positions, and using a candidate character having a maximum probability as the character string recognition result of the target image block.

9. The method according to claim 1, wherein the calculating, based on the convolutional neural network algorithm and the training values of the plurality of to-be-determined parameters, a target probability set corresponding to the target image block comprises:
  when the to-be-recognized target image block is obtained, based on the training value of each to-be-determined parameter of the convolutional neural network algorithm, performing convolutional processing for a first preset quantity of times, pooling processing for a second preset quantity of times, and linear processing for a third preset quantity of times on the target image block to obtain an expression of a corresponding second feature vector, and performing softening processing on the expression of the second feature vector and constructing a target probability set corresponding to the character string recognition result of the sample image block.

10. A computing device for recognizing a character string in an image comprising one or more processors, memory and one or more programs stored in the memory that, when executed by the one or more processors, cause the computing device to perform a plurality of operations including:
  constructing an expression of a probability set corresponding to a character string recognition result of a pre-stored sample image block of a character string based on a convolutional neural network algorithm, the expression of the probability set being constituted by a plurality of to-be-determined parameters of the convolutional neural network algorithm, and probabilities in the probability set used for indicating a probability that a character at one of a preset quantity of character positions is one of a plurality of preset characters;
  training the plurality of to-be-determined parameters to obtain a training value for each to-be-determined parameter based on a training target of maximizing a probability that the character string recognition result determined according to the probability set is the character string comprised in the pre-stored sample image block;
  obtaining a to-be-recognized target image block;
  calculating, based on the convolutional neural network algorithm and the training values of the plurality of to-be-determined parameters, a target probability set corresponding to the target image block; and
  determining, according to the target probability set, a character string recognition result of the target image block.

11. The computing device according to claim 10, wherein the operation of constructing an expression of a probability set corresponding to a character string recognition result of a pre-stored sample image block of a character string based on a convolutional neural network algorithm comprises:
  performing convolutional processing for a first preset quantity of times, pooling processing for a second preset quantity of times, and linear processing for a third preset quantity of times on the image data of the sample image block to obtain an expression of a corresponding first feature vector; and
  performing softening processing on the expression of the first feature vector and constructing the expression of the probability set corresponding to the character string recognition result of the sample image block.

12. The computing device according to claim 10, wherein the operation of training the plurality of to-be-determined parameters to obtain a training value for each to-be-determined parameter comprises:
  determining, based on the expression of the probability set, a probability function of constituting the character string comprised in the pre-stored sample image block by using characters at the preset quantity of character positions; and
  using the probability function as a target function and training the plurality of to-be-determined parameters based on a training target of maximizing a value of the target function, to obtain a training value for each to-be-determined parameter.

13. The computing device according to claim 12, wherein the operation of determining, based on the expression of the probability set, a probability function of constituting the character string comprised in the pre-stored sample image block by using characters at the preset quantity of character positions comprises:
  determining a character string whose quantity of characters is the preset quantity and that satisfies a preset character feature condition, wherein the preset character feature condition is that the character string comprised in the pre-stored the sample image block is obtained after combination of adjacent repeated characters and removal of blank space characters;
  determining, based on the expression of the probability set, a probability expression corresponding to each character string whose quantity of characters is the preset quantity and that satisfies the preset character feature condition; and
  performing summation on the determined probability expressions to obtain a probability function.

14. The computing device according to claim 13, wherein the operation of determining, based on the expression of the probability set, a probability expression corresponding to each character string whose quantity of characters is the preset quantity and that satisfies the preset character feature condition comprises:
  for each character string whose quantity of characters is the preset quantity and that satisfies the preset character feature condition, searching the expression of the probability set, for a probability expression of each character in the character string at a corresponding character position, and performing multiplication on all the found probability expressions, to obtain a probability expression corresponding to the character string.

15. The computing device according to claim 10, wherein the operation of determining, according to the target probability set, a character string recognition result of the target image block comprises:

separately determining, according to the target probability set, a preset character having a maximum probability at each character position comprised in the preset quantity of character positions; and determining the character string recognition result of the target image block according to the preset character having the maximum probability at each character position comprised in the preset quantity of character positions.

16. The computing device according to claim 15, wherein the operation of determining the character string recognition result of the target image block according to the preset character having the maximum probability at each character position comprised in the preset quantity of character positions comprises:

combining the preset characters having the maximum probabilities at the character positions comprised in the preset quantity of character positions into a target character string; and performing combination of adjacent repeated characters and blank space character removal on the target character string, to obtain the character string recognition result of the target image block.

17. The computing device according to claim 10, wherein the operation of determining, according to the target probability set, a character string recognition result of the target image block comprises:

determining, according to the target probability set, a probability of forming each candidate character string by combining the characters at the preset quantity of character positions, and using a candidate character having a maximum probability as the character string recognition result of the target image block.

18. The computing device according to claim 10, wherein the calculating, based on the convolutional neural network algorithm and the training values of the plurality of to-be-determined parameters, a target probability set corresponding to the target image block comprises:

when the to-be-recognized target image block is obtained, based on the training value of each to-be-determined parameter of the convolutional neural network algorithm, performing convolutional processing for a first preset quantity of times, pooling processing for a second preset quantity of times, and linear processing for a third preset quantity of times on the target image block to obtain an expression of a corresponding second feature vector, and performing softening processing on the expression of the second feature vector and constructing a target probability set corresponding to the character string recognition result of the sample image block.

19. A non-transitory computer readable storage medium storing one or more programs that, when executed by one or more processors of a computing device for recognizing a character string in an image, cause the computing device to perform a plurality of operations including:

constructing an expression of a probability set corresponding to a character string recognition result of a pre-stored sample image block of a character string based on a convolutional neural network algorithm, the expression of the probability set being constituted by a plurality of to-be-determined parameters of the convolutional neural network algorithm, and probabilities in the probability set used for indicating a probability that a character at one of a preset quantity of character positions is one of a plurality of preset characters;

training the plurality of to-be-determined parameters to obtain a training value for each to-be-determined parameter based on a training target of maximizing a probability that the character string recognition result determined according to the probability set is the character string comprised in the pre-stored sample image block;

obtaining a to-be-recognized target image block;

calculating, based on the convolutional neural network algorithm and the training values of the plurality of to-be-determined parameters, a target probability set corresponding to the target image block; and determining, according to the target probability set, a character string recognition result of the target image block.

20. The non-transitory computer readable storage medium according to claim 19, wherein the operation of constructing an expression of a probability set corresponding to a character string recognition result of a pre-stored sample image block of a character string based on a convolutional neural network algorithm comprises:

performing convolutional processing for a first preset quantity of times, pooling processing for a second preset quantity of times, and linear processing for a third preset quantity of times on the image data of the sample image block to obtain an expression of a corresponding first feature vector; and performing softening processing on the expression of the first feature vector and constructing the expression of the probability set corresponding to the character string recognition result of the sample image block.

* * * * *